UNITED STATES PATENT OFFICE.

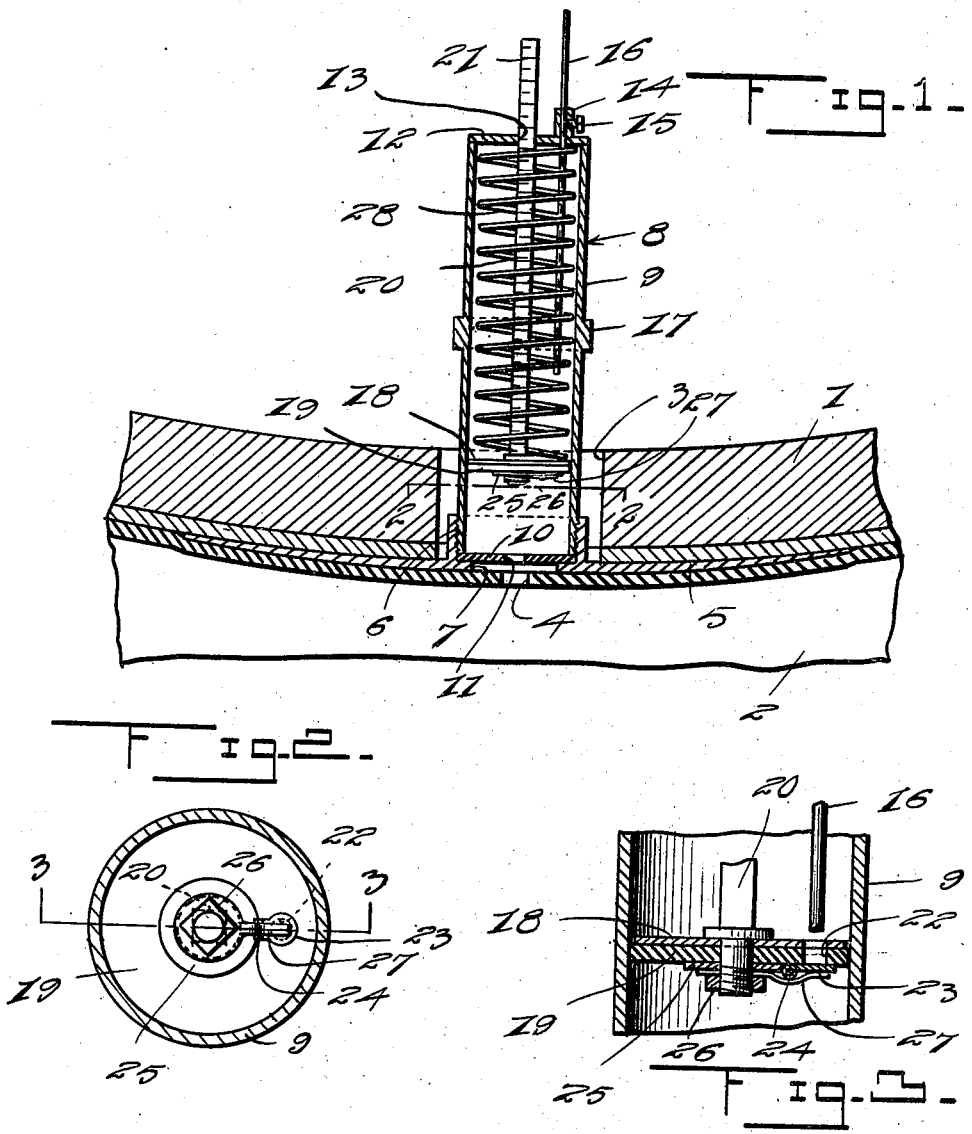

WALTER G. BRANZ, OF LONG POINT, ILLINOIS.

PRESSURE-GAGE AND EXHAUST-VALVE.

1,223,252.  Specification of Letters Patent.  Patented Apr. 17, 1917.

Application filed February 25, 1916. Serial No. 80,453.

*To all whom it may concern:*

Be it known that I, WALTER G. BRANZ, a citizen of the United States, residing at Long Point, in the county of Livingston and State of Illinois, have invented certain new and useful Improvements in Pressure-Gages and Exhaust-Valves; and I do hereby declare the following to be a full, clear, and exact description of the invention, such as will enable others skilled in the art to which it appertains to make and use the same.

This invention relates to new and useful improvements in pressure gages and exhaust valves and is particularly adapted for use in connection with the tires of motor vehicles in order that excessive pressure therein will be automatically relieved.

Another object of the invention is to provide a gage which will enable the operator of the vehicle to readily determine the quantity of air pressure within the tire without the necessity of removing the usual catch covering the valve and applying the ordinary type of gage thereto.

Still another object of the invention is to provide a device which may be adjusted so as to relieve the pressure after it reaches a predetermined height, thereby avoiding the possibility of a blow-out.

Still another object of the invention is to provide a simple and efficient device which may be readily applied to the tire without affecting the durability thereof.

With these and other objects in view, the invention consists in the novel combination and arrangement of parts which will be fully set forth in the following specification and accompanying drawings, in which:—

Figure 1 is a fragmentary view of a tire and rim illustrating this improved attachment applied thereto, the said view being in section.

Fig. 2 is a transverse sectional view on line 2—2 of Fig. 1, and

Fig. 3 is an enlarged transverse sectional view on the line 3—3 of Fig. 2.

Referring to the drawings the numeral 1 designates the rim of a wheel having the usual tire 2 applied thereto. The rim is provided with a suitable aperture 3 through which the combined pressure gage and relief valve projects. The tire 2 is formed with an opening 4 which alines with the relief valve as clearly illustrated in the drawing so as to permit the air within the tire to flow into the cylinder of the valve. Surrounding the opening 4 is the usual guard plate 5 which is constructed in accordance with the ordinary guard plate used around the usual tire valve and this plate 5 is provided with a hollow internally threaded collar 6 which extends partially into the opening 3 as illustrated in Fig. 1. The collar 6 is formed centrally of the plate 5 and a suitable aperture 7 is formed centrally of the plate and communicates with the interior of the collar as illustrated in the drawings.

The combined pressure gage and relief valve is designated generally by the numeral 8 and comprises a cylinder 9 having external screw threads at one end which are adapted to coöperate with the threads in the collar 6. A washer 10 is interposed between the inner end of the cylinder 9 and the plate 5 and is formed with a central aperture 11 which alines with the opening 4 as shown in Fig. 1. The end of the cylinder 9 opposite the end which is positioned within the collar 6 is provided with a suitable closure 12 having formed therein a central aperture 13. This aperture is rectangular to receive the rectangular stem of the valve piston which will be more fully hereinafter described. Formed integrally with the closure 12 and extending upwardly therefrom near its edge is a hollow boss 14 having a set screw 15 therein. This set screw is adapted to engage the push rod 16 to hold the same in various adjusted positions. This push rod extends into and out of the cylinder as clearly shown in the drawing and the inner end is adapted to engage the relief valve to control the opening thereof as will be more fully hereinafter described.

In order to provide a means by which the cylinder may be placed in position or removed therefrom a suitable enlarged portion 17 is formed intermediate its ends and is preferably provided with flattened faces for engagement by a wrench or any other suitable tool by which the device may be removed.

Slidably mounted within the cylinder 9 is the piston 18 carrying a washer 19 adapted for engagement with the inner wall of the cylinder to form an air-tight joint in order to prevent the escape of the fluid from the tire. A suitable stem 20 extends outwardly from the piston and through the opening 13 and this stem is preferably rectangular in cross section and provided with a plurality of graduations 21 at spaced intervals on all of its faces in order to regulate the pressure within the tire. The piston 18 and the washer 19 are formed with alining openings 22 near their edges which are adapted to aline with the opening in the boss 14 and these openings are closed by a suitable flap valve 23 which is pivotally connected at 24 to the plate 25 on the inner side of the washer. The plate, washer and piston are held in place by a suitable nut 26, threaded on the lower end of the rod 21 and a spring 27 is positioned between the nut and the outer side of the plate and normally bears against the flap valve 23 to force the same upwardly against the inner side of the washer 19.

It will be apparent from the foregoing that in use, the tire is inflated to the proper pressure and the push rod 16 is then adjusted so that its inner end projects slightly into the opening 22. In event that the pressure in the tire becomes excessive due to heating it will be evident that the piston will move upwardly against the compression of the spring 28 thereby causing the valve 23 to move into engagement with the rod 16 and upon further movement it will be seen that the valve 23 will be moved slightly open thereby permitting the excessive pressure to escape. As soon as the pressure is relieved, it will be seen that the spring 28 will act to force the piston back to its original position thereby moving the valve 23 out of engagement with the push rod 16 and discontinuing the exhaust of air from the tire. In this way it will be seen that the danger of a blow-out is materially decreased and a considerable saving is effected. In fitting the push rod 16 to the proper point, the same is moved upwardly until the tire is inflated to the proper pressure whereupon the rod 16 is moved downwardly and into close proximity to the valve 23 whereupon the set screw 15 is tightened and it will thus be seen that after the rod has been set for the first time the possibility of over inflation of the tire is eliminated and the necessity of resetting the device each time the tire is inflated is eliminated. It will also be seen that the graduations on the piston rod 20 will serve to inform the operator of the vehicle of the air pressure within the tires and avoid the necessity of carrying an additional pressure gage and the removal of the various caps from the tire in order to determine the pressure therein.

While in the foregoing there has been shown and described the preferred embodiment of this invention, it is to be understood that such changes may be made in the combination and arrangement of parts as will fall within the spirit and scope of the appended claims.

What is claimed is:—

1. A pressure gage and exhaust valve comprising a cylinder, a head closing one end of said cylinder, threads formed on the opposite end of the cylinder, a plate adapted to fit between a tire and its rim, a collar formed centrally of the plate and being provided with internal threads, the cylinder being adapted to be threaded into the collar, the plate being provided with a central aperture formed within the collar, a gasket adapted to fit between the inner edge of the cylinder and the plate, the cylinder head having an opening near its side edge, a collar surrounding the last named opening, a rod adjustable within the collar, means to hold the rod in adjusted position, a piston slidable in the cylinder, the edge of the piston bearing against the cylinder to form a fluidtight joint, a spring bearing against the inner side of the head and on the outer side of the piston to normally urge the piston inwardly, the piston being provided with a port arranged in alinement with the rod and a valve for closing said port, said valve being adapted to be opened by the rod when the piston moves upwardly beyond a predetermined point.

2. A pressure gage and exhaust valve comprising a cylinder, a head closing one end of said cylinder, threads formed on the opposite end of the cylinder, a plate adapted to fit between a tire and its rim, a collar formed centrally of the plate and being provided with internal threads, the cylinder being adapted to be threaded into the collar, the plate being provided with a central aperture formed within the collar, a gasket adapted to fit between the inner edge of the cylinder and the plate, the cylinder head being provided with a central opening and having an opening near its side edge, a collar surrounding the last named opening, a rod adjustable within the collar, means to hold the rod in adjusted position, a piston slidable in the cylinder, the edge of the piston bearing against the cylinder to form a fluidtight joint, a spring bearing against the inner side of the head and on the outer side of the piston to normally urge the piston inwardly, the piston being provided with a port arranged in alinement with the rod, a valve for closing said port, said valve being adapted to be opened by the rod when the piston moves upwardly beyond a predetermined point, and a piston rod connected to the piston and slidable through the central opening in the head, said rod being provided with graduations thereon in order to indicate the air pressure within the tire.

3. In a device of the class described, a cylinder communicating with the interior of a vehicle tire, a head at the outer end of the cylinder, said head being provided with a central aperture, a piston rod slidable through the aperture, a collar formed near the inner end of the piston rod, threads formed at the inner end of the piston rod, a disk seated on the piston rod adjacent the collar, a washer seated against the disk and adapted to contact with the wall of the cylinder to form a fluidtight joint, a plate seated against the washer on its underside, the disk and washer being provided with alined openings, a flap valve hinged to the plate and adapted to close the openings, a spring surrounding the threaded portion of the piston rod and adapted to bear against the flap valve to normally hold the same closed, a nut threaded on the threads of the piston rod to firmly clamp the whole in place and an adjustable push rod mounted within the head and extending into the cylinder, said push rod being adapted to aline with the opening in the piston whereby when the piston moves upwardly beyond a predetermined point the push rod will engage the valve and open the same.

In testimony whereof I affix my signature in presence of two witnesses.

WALTER G. BRANZ.

Witnesses:
L. F. EMM,
THOS. LANZAN.